Jan. 15, 1963
D. W. TURNER
3,073,776
ELECTRIC TREATER
Filed June 30, 1959
2 Sheets-Sheet 1
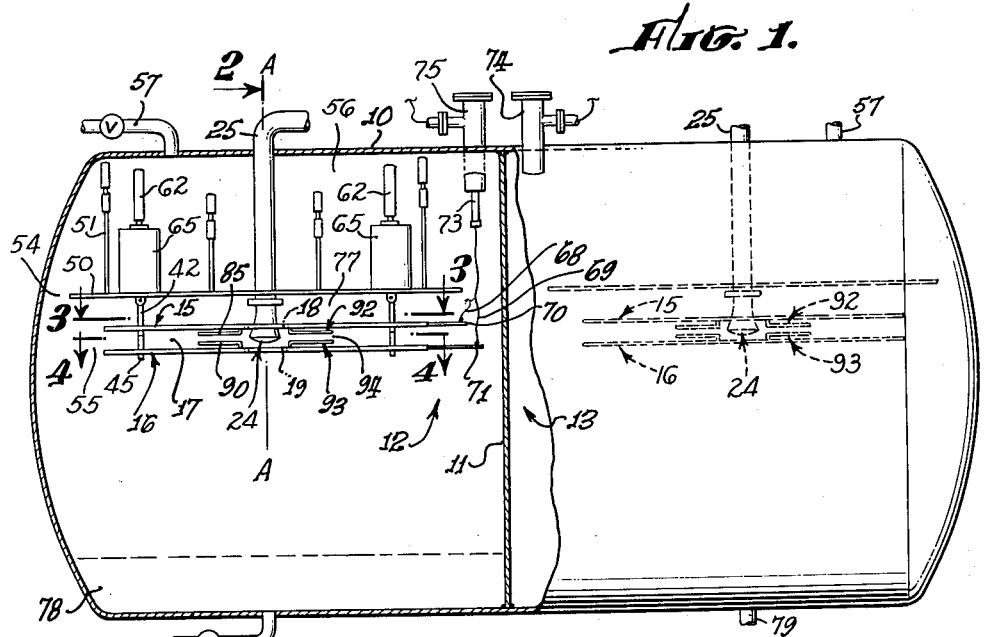
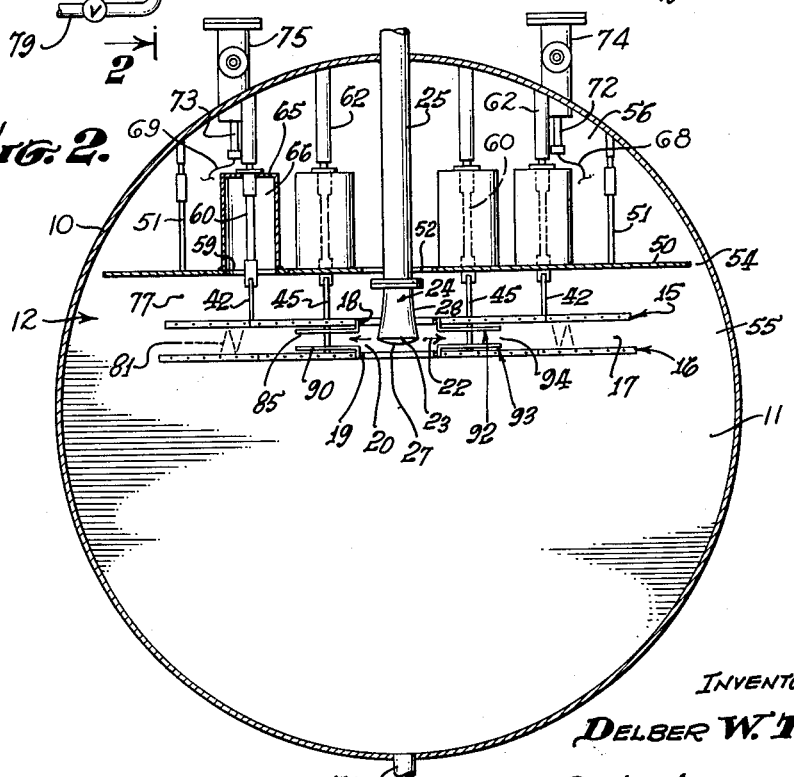
INVENTOR.
DELBER W. TURNER,
By HIS ATTORNEYS.
HARRIS, KIECH, RUSSELL & KERN

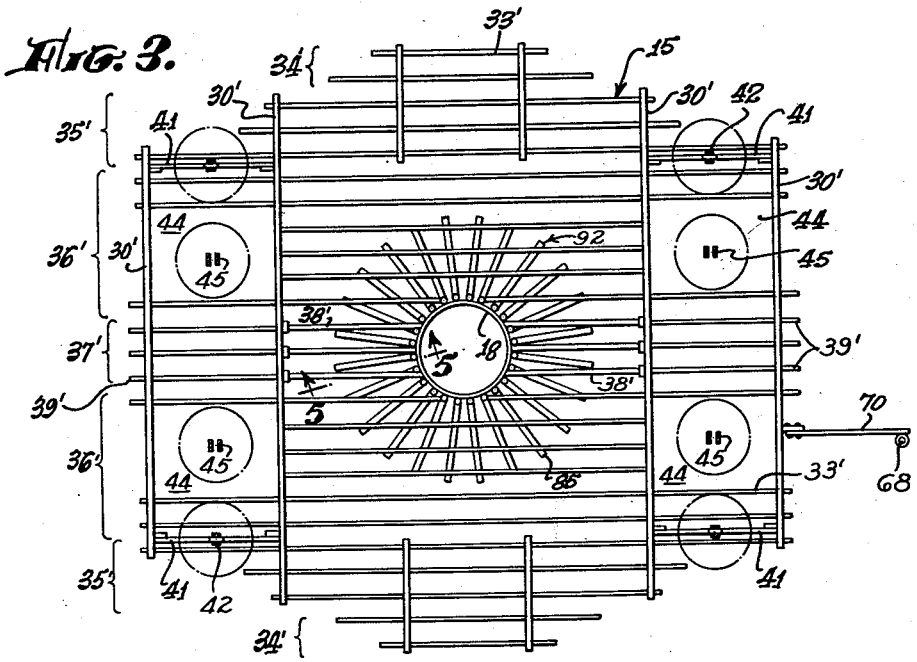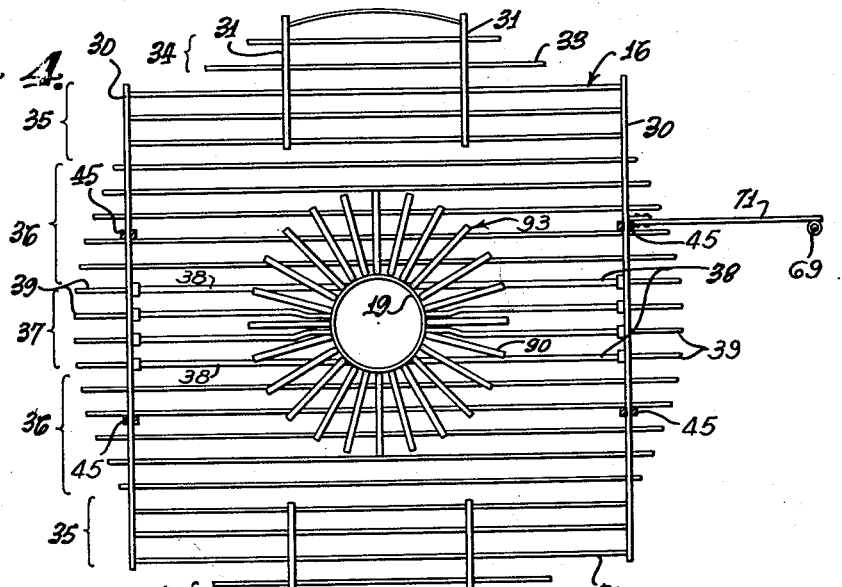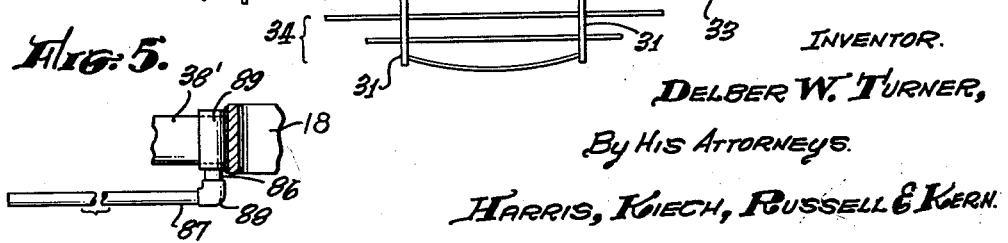

United States Patent Office 3,073,776
Patented Jan. 15, 1963

3,073,776
ELECTRIC TREATER
Delber W. Turner, Houston, Tex., assignor to Petrolite Corporation, Wilmington, Del., a corporation of Delaware
Filed June 30, 1959, Ser. No. 824,095
13 Claims. (Cl. 204—302)

My invention relates to the electric resolution of oil-continuous emulsions and more particularly to a novel electric emulsion treater and a novel field-establishing electrode system therefor.

It has previously been proposed to resolve petroleum emulsions by discharging them into the side of a space between parallel electrodes to flow generally parallel thereto. The electric field in such an interelectrode space coalesces the dispersed droplets of the emulsion into larger masses of sufficient size to gravitate from the oil either in the electric field or after discharge therefrom. For example, in the patent to De Wit No. 2,681,311 the emulsion discharges into one side of a treating space between rectangular electrodes made of screen and in the patent to Eddy No. 2,182,145 the emulsion discharges radially outward from a central position in the inner side of a treating space between circular electrodes made of concentric rings. The emulsions thus treated may be those produced from oil wells, containing such amount of water as to require dehydration, or they may be artificial emulsions that are purposely made in processes of purifying oils, for example, in the desalting of crude oils as taught in the Eddy patent supra. All such emulsions and the ones here involved may range from those that are highly stabilized to more temporary systems that are mere dispersions.

I have found that the electric treatment of oil-continuous emulsions can be improved by subjecting them to a preliminary treating field of high intensity or voltage gradient preceding treatment in a main treating field of lower intensity or gradient. It is an object of the invention to shock treat a stream of emulsion adjacent the point of entry into a main treating field by subjecting it to a field of much higher intensity or voltage gradient compared with the main treating field. A further object is to establish an intense pretreating electric field in the entrance zone of an interelectrode space in which the main treating field is established.

The field of higher intensity is preferably bounded on at least one side by arms or rods extending in the direction of emulsion flow. It is an object of the invention to provide such a system irrespective of whether or not there is any later electrical treatment of the emulsion in a main treating field. The manner in which the high intensity field is established is unique irrespective of its association with any succeeding electric field.

In the preferred practice of the invention, the voltage gradient in such a high intensity field preferably decreases in the direction of flow. It is an object of the invention to provide spaced sets of radial arms to form a treating field and preferably to offset the arms of one set relative to the arms of the other so that the voltage gradient decreases toward the outer portion of the interarm treating space.

Further objects of the invention reside in the use of a large number of straight electrode members uniquely supported in parallel relationship to form a foraminous electrode. A further object is to employ such straight electrode members in the formation of an electrode of generally circular shape.

Further objects and advantages of the invention will be evident to those skilled in the art from the following description of an exemplary embodiment of the invention, illustrated in the drawings, in which:

FIG. 1 is an elevational view of an electric treater, partially in vertical section, incorporating the invention;
FIG. 2 is a cross-sectional view taken along the line 2—2 of FIG. 1;
FIG. 3 is a view of the upper electrode, taken along the line 3—3 of FIG. 2;
FIG. 4 is a similar view of the lower electrode taken along the line 4—4 of FIG. 1; and
FIG. 5 is a detail taken along the line 5—5 of FIG. 3.

Referring particularly to FIGS. 1 and 2, the electrode system of the invention is shown in conjunction with a horizontal electric emulsion treater including a cylindrical tank 10 divided centrally by a partition 11 to form two treating chambers 12 and 13, each equipped with the electrodes to be described and being used either separately or in conjunction with each other. If used separately, a stream of the emulsion to be treated may be divided between the two chambers. If used in conjunction with each other one desirable sequence involves the dehydration of a crude petroleum emulsion in the chamber 12 followed by further treatment of the effluent oil in the chamber 13. By way of example, such further treatment may involve a further dehydration treatment or an electric desalting treatment. As the equipment in the chambers 12 and 13 is identical, only the former will be described in detail.

Generally speaking, the field-establishing electrode system in the chamber 12 includes an upper electrode 15 and a substantially parallel lower electrode 16 surrounding an axis A—A and spaced to define an interelectrode main treating space 17. The electrodes 15 and 16 are generally circular and respectively provide support members such as rings 18 and 19, best shown in FIGS. 3 and 4, concentric with the axis A—A but spaced from each other therealong. The resulting interelectrode treating space 17 is thus annular and provides an entrance side adjacent the rings opening on an entrance zone 20 of the interelectrode space.

The emulsion to be treated is discharged into the entrance zone 20 as a radial sheet flowing in a discharge plane as indicated by arrows 22 from a circular emulsion discharge orifice 23 of an emulsion distributor 24 which extends through one of the previously described rings. As shown, the emulsion distributor 24 is carried by a supply pipe 25 which extends from a position outside the top of the tank 10 to support the distributor 24 centrally within the ring 18. The emulsion distributor 24 may be of the type as shown in Mahone No. 2,393,328, providing a movable head 27 extending across the end of a tubular body member 28 to form therebetween the circular emulsion-discharge orifice 23 unobstructed at all peripheral positions to discharge the high velocity sheet of emulsion into the entrance zone 20 of the interelectrode space. The emulsion-discharge orifice 23 faces the entrance side of this interelectrode space and is in a plane parallel to the rings 18 and 19 but at an elevation therebetween. Various types of emulsion distributors can be employed but it is desirable that the discharge orifice thereof be elongated in a plane between and substantially parallel to the electrodes. This is true irrespective of whether an annular interelectrode space is employed. If electrodes of other shape are utilized, as in the De Wit patent supra, the emulsion distributor will extend along the entrance side and the emulsion-discharge orifice 23 will be elongated in a plane substantially parallel to the electrodes.

Referring particularly to FIG. 4, the lower electrode 16 includes a plurality of parallel electrode support bars spaced from each other and having outer ends terminating in a generally circular pattern. As shown, the lower electrode includes two longer support bars 30 on opposite sides of the axis A—A and two side-by-side pairs of shorter support bars 31 spaced outwardly of the axis A—A and positioned between the ends of the longer support bars 30. This leaves a central zone of the electrode free of support bars. A plurality of straight electrode members 33 bridge the support bars and extend substantially at right angles thereto. There are two outer groups 34 of such electrode members 33 joining only the shorter support bars 31 and preferably extending through and beyond these support bars. Likewise, FIG. 4 shows two inner groups 35 of electrode members joining the shorter and the longer support bars 30 and 31. Such electrode members may extend through such shorter and longer support bars to provide ends extending therebeyond, as in the upper electrode to be described, or they may terminate at the longer bars, as suggested in FIG. 4. Likewise FIG. 4 shows two innermost groups 36 of electrode members 33 joining only the longer support bars 30, preferably extending therethrough to provide ends projecting therebeyond. The ends of all of the electrode members 33 preferably terminate in a generally circular pattern forming a generally circular lower electrode.

To support the ring 19 a group 37 of four ring-support members 38 are utilized. While the electrode members 33 are preferably lengths of pipe or circular rods, the ring-support members 38 are preferably of bar stock, being elongated at a direction perpendicular to the paper in FIG. 4 to provide a rigid support for the ring 19. The inner end of each ring-support member 38 is welded to the outer periphery of the ring 19 while the outer end of each such member is welded or otherwise secured to the longer support bars 30. The ring-support members 38 also serve as electrode members. To complete the generally circular pattern, FIG. 4 shows short electrode members 39 extending outward from the longer support bars 30 in alignment with the ring-support members 38.

The construction of the upper electrode is quite similar, being shown in FIG. 3. Four longer support bars 30' are here employed, being bridged by straight electrode members 33' arranged in two outer groups 34', two inner groups 35' and two innermost groups 36'. A group 37' of three ring-support members 38' with extending short electrode members 39' complete the assembly, the inner ends of the members 38' suitably supporting the ring 18. The ends of all of the electrode members preferably terminate in a generally circular pattern, here slightly oval for support purposes and for providing passages for support of the lower electrode 16. In these latter connections, the longer support bars 30' are arranged in pairs on opposite sides of the electrode axis, each pair being bridged by two supporting bars 41 respectively connected to hangers 42 (FIGS. 2 and 3). Also, certain electrode members of the group 36' do not extend through the space between the paired support bars 30' leaving a space 44 for passage of hangers 45 attached to the longer support bars 30 of the lower electrode 16 in supporting relation.

A large baffle plate 50 is hung horizontally in the tank 10 by hangers 51. Both the tank and the baffle 50 are at ground potential, the latter containing an opening 52 for the pipe 25 and being separated from the tank and the partition 11 to provide a peripheral space 54 forming substantially the sole communication between a treating zone 55 containing the electrodes and an oil zone 56 from which treated oil is withdrawn through a pipe 57 (FIG. 1). The baffle 50 provides openings 59 for stick insulators 60 having their lower ends respectively connected to the hangers 42, 45 and their upper ends connected to supports 62 hanging from the upper interior of the tank 10. Hoods 65 rise in fluid tight relation from the baffle 50 to close the respective openings 59 and surround the corresponding insulators 60, forming pockets 66 entrapping bodies of oil around the respective insulators. By this arrangement both electrodes 15 and 16 are electrically insulated from the tank 10.

Any suitable high-voltage source is employed to establish a main treating field in the interelectrode space 17. In the usual practice, the terminals of such a source are respectively connected to conductors 68 and 69 respectively connected to the upper and lower electrodes through arms 70 and 71, the potential being transmitted to the interior of the tank 10 through inlet bushings 72 and 73 having upper ends extending into housings 74 and 75 in conventional manners. Such energization of the electrodes 15 and 16 will establish a main treating field in the interelectrode space 17 and an auxiliary electric field in the space 77 between the upper electrode 15 and the grounded baffle 50. If either of the electrodes 15 or 16 is to be operated at ground potential, such grounding can best be effected externally of the container. If the upper electrode 15 is grounded there will be no electric field in the space 77 but if only the lower electrode 16 is grounded electric fields will be established in both spaces 17 and 77.

The action of these fields and particularly the electric field in the interelectrode space 17 is to coalesce the dispersed particles of the incoming emulsion, forming larger masses which can settle to a body 78 thereof in the lower portion of the container from which liquid is periodically or continuously withdrawn through a valve pipe 79. The coalesced particles can settle in the chamber 12 either by dropping through the spaces between the electrode members 33 of the lower electrode or at positions beyond the periphery of the lower electrode, it being understood that the emulsion jets at relatively high velocity from the distributor 24. The electrode members 33 of the lower electrode 16 are preferably offset laterally from the electrode members 33' of the upper electrode as suggested in FIG. 2 whereby the most intense portions of the main treating field represent a zigzag pattern represented by the dotted lines 81.

It has been found that the treating action is unexpectedly benefited by employing a means for setting up a more intense electric field adjacent the entrance side of the main field to establish in the entrance portion of the main field a high gradient zone effecting a shock treatment of the emulsion. The preferred structure includes auxiliary electrode members connected to one or both of the electrodes 15, 16 inducing an electric field of much higher intensity exclusively in the entrance zone of the main field. The drawings illustrate auxiliary electrode members associated with both electrodes and extending in the direction of discharge in a radial pattern but it is to be understood that other patterns can be employed, depending on the shape of the main electrodes and whether it is desired that the emulsion flow along or across the spaced auxiliary electrode members.

As shown in FIGS. 3 and 5, the upper electrode 15 includes arm means connected to the ring 18 and comprising rods or arms 85 disposed in an auxiliary electrode plane and extending in the interelectrode space 17 in the direction of discharge from the orifice 23. The arms 85 are spaced from each other along the entrance side of the main treating space, each extending substantially parallel to the plane of the electrode in the particular embodiment shown. With circular electrodes the arms 85 extend radially. Each arm may constitute a bent rod having an upright or mounting portion welded to the ring 18 and a longer electrode portion extending along the electrode 15 or may constitute upright and lateral pipe sections 86 and 87 joined by an elbow 88 as best shown in FIG. 5. The pipe section 86 may be threaded into a coupling 89 which is in turn welded to the ring 18. Other attachments of the arms 85 to the ring are possible but it is preferred that the arms extend in a radial pattern in a plane below the plane of the electrode members 33' of the upper electrode.

In similar manner, rods or arms 90 are attached to the ring 19 of the lower electrode 16 in a radial pattern which is congruent with the pattern of the arms 85 of the upper electrode. The arms 85 and 90 respectively form upper and lower auxiliary electrodes 92 and 93 spaced to define a pretreating space or high gradient treating space 94 into which the incoming sheet of emulsion is sidewardly jetted.

If the arms 85 are immediately above the arms 90 the field therebetween in the high gradient treating space 94 will be essentially of uniform intensity measured between these arms at positions close to and further removed from the emulsion distributor. While this orientation will produce advantageous results it is preferred to offset laterally the arms of the congruent patterns so that the arms of one set are respectively opposite the interarm spaces of the other set. Due to the radial arrangement of the arms, the distances between the arms of the two sets will thus progressively increase in a direction away from the axis A—A so that the intensity or voltage gradient of the field in the treating space 94 progressively decreases outwardly. Such difference in intensity can be augmented by arranging the arms 85 and 90 to flare slightly in the direction of emulsion discharge, a feature which can be utilized in itself to produce the field of decreasing gradient if the congruent patterns are not offset laterally. In instances where a lateral offset is desired but a field intensity more nearly uniform is desired in the direction of emulsion flow, the arms 85 and 90 can converge slightly in such direction.

The volume of the interarm treating space 94 is preferably small as compared to the volume of the interelectrode space 17, being usually only about 10–20% of the latter. A very high voltage gradient can thus be established for the initial treatment without imposing heavy loads on the potential source. The treating action of high intensity fields is very rapid and with the arrangement shown all portions of the incoming emulsion are subjected to the initial high-gradient treatment. Electric treaters equipped with the auxiliary electrodes 92 and 93 produce cleaner influent oils and effect better separation of the internal phase of the emulsion from the external phase thereof. In the electric desalting process exemplified in the patent to Eddy supra, installation of these auxiliary electrodes has significantly bettered the percentage removal of salts and significantly reduced the residual salt content of the treated effluent oil.

Various changes and modifications can be made without departing from the spirit of the invention as defined in the appended claims.

I claim as my invention:

1. An electrode system including: first and second flat electrodes each having a plurality of parallel electrode support bars spaced from each other and having ends terminating in a generally circular pattern, each electrode having a large number of parallel and uniformly spaced straight electrode members at substantially right angles to said support bars having cantilever end portions terminating in ends disposed beyond said support bars in a generally circular pattern; means for spacing and electrically insulating said first and second electrodes in parallel planes to define an interelectrode space therebetween; and means for delivering the fluid to be treated to the interelectrode space.

2. An electrode system including: first and second parallel flat electrodes spaced from each other along a common central axis, each electrode having a plurality of parallel electrode support bars spaced from each other including two longer support bars on opposite sides of said axis and two pairs of shorter support bars spaced outwardly of said axis and positioned between the ends of said longer support bars, each electrode having a large number of straight electrode members perpendicular to and connected to the support bars of such electrode, some of said electrode members joining only the shorter support bars of the respective pairs and some of said electrode members joining the shorter and the longer support bars.

3. An electrode system as defined in claim 2 in which said large number of straight electrode members includes also some electrode members joining only the longer support bars.

4. An electrode system as defined in claim 2 in which the electrode members joining only the shorter bars are in two outer groups and extend through and beyond such shorter bars providing cantilever end portions projecting therebeyond, and in which the electrode members joining the shorter and the longer support bars are in two inner groups and extend through the shorter support bars to the longer support bars, the ends of all said electrode members terminating in a generally circular pattern.

5. An electrode system as defined in claim 2 in which at least one of said electrodes includes a ring concentric with said axis, and including ring support members extending between said ring and said longer support bars parallel to said electrode members.

6. A field-establishing electrode system for an electric emulsion treater including in combination: spaced main electrodes defining an interelectrode space having an entrance zone opening on an entrance side of the interelectrode space; means for electrically insulating said main electrodes from each other; means for developing a high-voltage potential difference between said main electrodes to establish a high-voltage electric field in said interelectrode space; means for jetting a thin sheet of the emulsion in a discharge plane at high velocity into said entrance zone of said interelectrode space from said entrance side thereof comprising an emulsion distributor having an emulsion discharge orifice elongated in said discharge plane and means for mounting said distributor in spaced relation with each of said main electrodes with said discharge plane substantially parallel to the midplane of said interelectrode space and with said emulsion discharge orifice facing said entrance side of said interelectrode space; and means for setting up a more intense high-voltage electric field exclusively in said entrance zone of said interelectrode space in the path of emulsion flow from said orifice immediately upon discharge therefrom, said last-named means comprising a first set of auxiliary electrodes comprising a plurality of rods and means for mounting said rods on and electrically connected to one of said main electrodes in spaced relationship with each other in said entrance zone of said interelectrode space with said rods extending in the direction of discharge of said emulsion from said distributor, said mounting means mounting said rods in an auxiliary electrode plane substantially parallel to but spaced from said discharge plane of said orifice, said auxiliary electrode plane and said other main electrode being on opposite sides of said discharge plane, the distance between each of said rods and the other main electrode being less than the distance between said main electrodes to establish said more intense electric field between said other main electrode and said rods.

7. An electrode system as defined in claim 6 in which said means for setting up said more intense field includes also a second set of auxiliary electrodes comprising a plurality of rods and means for mounting said rods of said second set on and electrically connected to said other of said main electrodes in spaced relationship with each other in said entrance zone of said interelectrode space with said rods extending in the direction of discharge of said emulsion from said distributor, said last-named mounting means mounting said rods of said second set in a second auxiliary electrode plane on the opposite side of said discharge plane from said auxiliary electrode plane of said first set but substantially parallel to said discharge plane to form said more intense electric field between the rods of said sets of auxiliary electrodes.

8. An electrode system as defined in claim 7 in which the rods of one set of auxiliary electrodes are laterally offset with respect to the positions of the rods of the other set.

9. An electrode system as defined in claim 6 in which said one main electrode provides a support member extending along said entrance side of said interelectrode space, and in which each of said rods of said first set comprises a short mounting portion and a longer electrode portion extending substantially parallel to said discharge plane, said mounting and electrode portions being angularly disposed, said mounting means including means for attaching said mounting portions of said rods to said support member at spaced positions therealong said mounting portions supporting said longer electrode portions in cantilever relation in said entrance zone.

10. A field-establishing electrode system for an electric emulsion treater including in combination: two rings concentric with a common axis and lying in parallel planes spaced from each other along such axis; a set of metallic arms secured to, electrically connected to and extending substantially radially from each ring, said sets of arms being spaced from each other in the direction of said axis to define therebetween an annular treating space around said axis between the sets of arms of the two rings; means for establishing a potential difference between said sets of rings and between said sets of metallic arms; and means for jetting the emulsion to be treated radially outwardly in said treating space, said jetting means comprising an emulsion distributor providing a circular outwardly-directed orifice concentric with said axis discharging in a plane that is between said parallel planes and between said spaced sets of arms.

11. An electrode system as defined in claim 10 in which the arms of one set lie opposite and substantially parallel to the arms of the other set.

12. An electrode system as defined in claim 10 in which the arm patterns of the two sets are substantially congruent and in which the arms of one set are opposite the interarm spaces of the other set.

13. An electrode system as defined in claim 10 including two main electrodes extending outward from said common axis in planes substantially parallel to each other but spaced apart a greater distance than said spacing of said sets of arms, said rings being respectively attached to and electrically connected to said two main electrodes, said two main electrodes extending outward from said common axis beyond said sets of arms, said sets of arms being in planes between said planes of said main electrodes.

References Cited in the file of this patent

UNITED STATES PATENTS

| | | |
|---|---|---|
| 1,838,890 | Van Leonen | Dec. 29, 1931 |
| 1,838,934 | Fisher | Dec. 29, 1931 |
| 2,393,328 | Mahone | Jan. 22, 1946 |
| 2,681,888 | McCraw | June 22, 1954 |
| 2,855,357 | Stenzel | Oct. 7, 1958 |
| 2,880,158 | Turner | Mar. 31, 1959 |
| 2,881,125 | Waterman | Apr. 7, 1959 |
| 2,894,895 | Turner | July 14, 1959 |

FOREIGN PATENTS

| | | |
|---|---|---|
| 709,626 | Great Britain | June 2, 1954 |